April 13, 1948.  J. CAFFESE  2,439,449
CULTIVATOR DISC SUPPORTING ASSEMBLY
Filed July 27, 1943
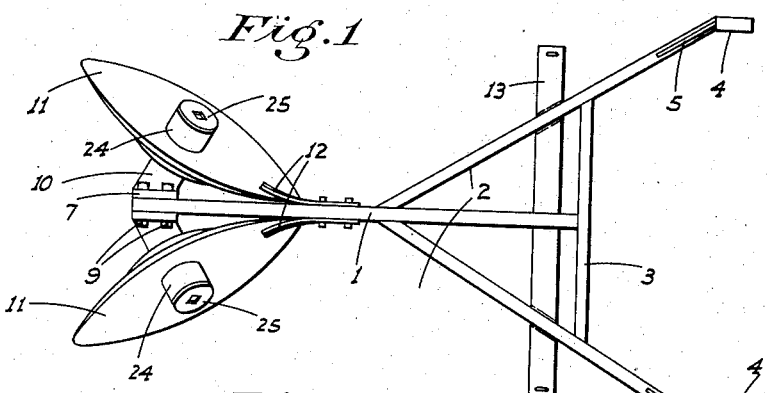
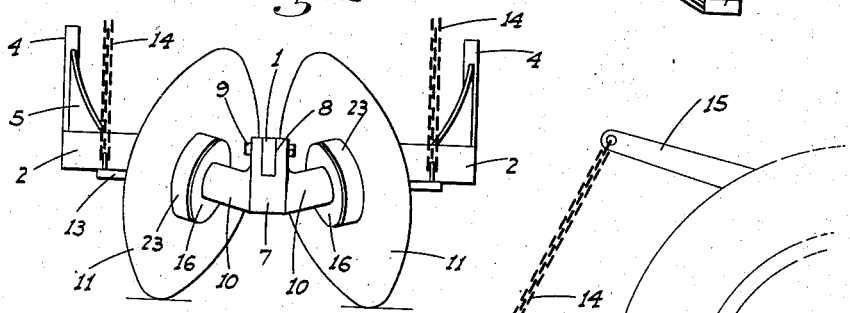
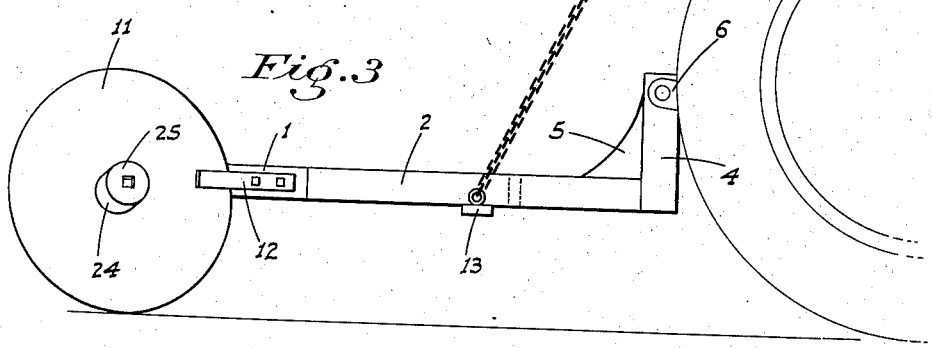
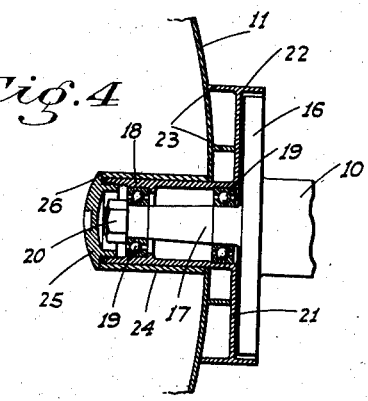
INVENTOR
Joseph Caffese
BY
ATTYS Patented Apr. 13, 1948

2,439,449

UNITED STATES PATENT OFFICE 2,439,449

CULTIVATOR DISC SUPPORTING ASSEMBLY

Joseph Caffese, Stockton, Calif.

Application July 27, 1943, Serial No. 496,293

1 Claim. (Cl. 308—19)

This invention relates in general to improvements in agricultural implements, and in particular the invention is directed to, and it is an object to provide, a ridge breaker or cutter of novel construction; the implement being useful to cut down irrigation checks or ridges in fields prior to cultivation of the latter. The substantial leveling of checks or ridges prior to tractor-plow cultivation of a field is desirable, as otherwise the tractor must climb up and drop over each ridge, with resultant power loss, as well as discomfort and annoyance to the tractor driver.

A further object is to provide an implement of the type, and for the purpose described, which includes a draft assembly and a pair of generally opposed or laterally facing cultivator discs mounted in connection with the rear end portion of said draft assembly; the discs being disposed in forwardly converging relation and canted inward at the top.

An additional object of the present invention is to provide a novel draft assembly for the implement, said assembly comprising a longitudinally extending drawbar, a pair of draft arms secured at their rear ends to the drawbar on opposite sides and intermediate the ends of the latter, said arms thence projecting forwardly in symmetrical diverging relation to the drawbar to a termination some distance ahead thereof, a cross beam rigidly connected between said draft arms intermediate their ends and supporting the forward end of the drawbar, and elements on the forward end of said draft arms for attachment to a tractor; the disc assembly being mounted on the rear end of the drawbar. The above draft assembly is strong, resists twisting strains, and maintains the cultivator disc assembly in correct position relative to the ground.

An additional object of the invention is to provide, in the disc assembly, a novel bearing structure which permits of easy and ready removal of the cultivator discs for replacement or repair.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Figure 1 is a top plan view of the implement.

Figure 2 is a rear end view of the implement.

Figure 3 is a side elevation of the implement.

Figure 4 is a fragmentary sectional elevation of one of the cultivator disc supporting bearing assemblies.

Referring now more particularly to the characters of reference on the drawings, my improved implement embodies a draft assembly comprising a heavy-duty, longitudinally extending drawbar 1 disposed above the ground in generally horizontal relation thereto. A pair of draft arms 2 are secured at their rear ends to the drawbar 1 intermediate the ends of the latter; said draft arms projecting forwardly in symmetrical diverging relation to said drawbar to a termination some distance ahead thereof. A cross beam 3 is connected between the draft arms 2 between the ends of the latter, and the forward end of the drawbar 1 is secured to said cross beam centrally of the ends of the latter.

At the forward end of draft arms 2 I provide upstanding attachment ears 4, suitably braced as at 5, and each ear is adapted to be pivotally secured to a corresponding draft connection 6 on the tractor.

A cultivator disc assembly is mounted in connection with the rear end of the drawbar 1 and comprises the following:

A bracket 7, notched at the top as at 8, for the reception of the rear end of the drawbar, and into which notch said end of the drawbar is secured by bolts 9, is provided with forwardly diverging legs 10 which also have an upward and outward slope, as shown. Cultivator discs 11 are journaled on the outer ends of legs 10 by means of the bearing assembly hereinafter described; said discs converging forwardly and being canted inwardly at the top. The forward convergence of the discs is such that at their leading edge they run quite close to the sides of the drawbar. Scraper or cleaner blades 12 are mounted on the drawbar ahead of the discs and project thereinto in cooperating relation.

A transverse lifting member 13 is secured beneath and across the draft assembly parallel to and slightly rearwardly of the cross beam 3; the ends of said lifting member projecting laterally beyond the draft arms 2. Lifting chains 14 connect between the outer ends of member 13 and the rear ends of power-actuated lifting arms 15 which project rearwardly from the tractor above the draft connections 6. It will be seen that by raising or lowering the lifting arms 15, the depth of penetration of the discs 11 into the ground may be effectively controlled.

In use the implement is connected to a tractor in the manner described and is set so that the discs 11 are capable of substantial penetration into the ground. Thereafter the implement is drawn lengthwise of the ridge or check to be cut, and the discs break up the ridge to a substantial extent, the earth dug from each ridge being diverted laterally on opposite sides of the implement by the discs 11, and due to the positioning thereof, as described. Also, as the discs are canted inwardly at the top, or flared at the bottom, said discs have sufficient suction to maintain the same in the ground during operation of the implement. Further, as the discs are opposed the implement has no side draft or tendency to drift laterally off the ridge.

The discs 11 may be readily removed for replacement or repair, by reason of the unique bearing which I employ to support the same from the bracket 7, and each bearing structure comprises the following:

Each leg 10 of bracket 7 is formed at its outer end with an enlarged radially disposed, circular head 16, from the center of which a spindle 17 projects outwardly. A tubular rotary housing or hub 18 surrounds the spindle and is supported thereon for rotary movement by means of bearings 19; the assembly of said rotary housing and bearings being held on the spindle 17 and against axial displacement relative thereto by means of a nut 20 threaded on the outer end of spindle 17, said nut being releasably held against rotation by a cotter pin or the like.

The rotary housing 18 is formed with an integral circular back plate 21, which is of slightly greater diameter than the circular head 16 and includes a rearwardly projecting flange 22 overhanging the latter.

A plurality of annular and concentric disc engaging and backing flanges 23 are formed with and project forwardly from the back plate 21; the disc 11 being centered on the rotary housing 18 and engaging against flanges 23.

A disc securing sleeve 24 closely surrounds the tubular housing 18 and abuts against the face of the disc adjacent said rotary housing. A hub cap 25 is threaded into the outer end of the rotary housing 18 and includes a shoulder 26 which seats against the outer end of the disc securing sleeve 24, urging the latter axially inwardly and forcefully maintaining the disc 11 against the flanges 23 of back plate 21.

By merely removing the hub cap 25 and the disc securing sleeve 24, the disc 11 may be slipped off of the rotary housing 18 for replacement or repair.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A cultivator disc supporting assembly including in combination with a disc having a central bore, a fixed leg, an enlarged circular head on the end of the leg, a spindle projecting centrally from the head, a rotary housing journaled on the spindle and held against axial displacement, said housing projecting through the bore of the disc with a close running fit, a circular back plate formed with said rotary housing and having forwardly projecting, annular and radially spaced flanges which abut against the back of the disc, another annular flange on said back plate projecting rearwardly and closely overhanging the periphery of said circular head, a disc securing sleeve closely surrounding the rotary housing and abutting against the front of the disc, and a hub threaded into the outer end of the rotary housing and including a portion engaging the outer end of said sleeve in retaining relation thereto and to said disc.

JOSEPH CAFFESE.

REFERENCES CITED

The following references are of record in the file of this patent:

UNITED STATES PATENTS

| Number | Name | Date |
| --- | --- | --- |
| 358,246 | Arnett | Feb. 22, 1887 |
| 410,064 | Arnett | Aug. 27, 1889 |
| 734,018 | Van Brunt | July 21, 1903 |
| 1,602,244 | Newton et al. | Oct. 5, 1926 |
| 1,851,597 | Siems | Mar. 29, 1932 |
| 2,082,554 | Silver | June 1, 1937 |